(No Model.) 3 Sheets—Sheet 1.
C. R. FRIEDRICH.
SLAT BLIND.

No. 591,918. Patented Oct. 19, 1897.

Witnesses:
Richard Nürnberger
Moritz Spreet

Inventor:
Carl Robert Friedrich
by F. H. Richards.
Attorney.

(No Model.)  3 Sheets—Sheet 2.

C. R. FRIEDRICH.
SLAT BLIND.

No. 591,918. Patented Oct. 19, 1897.

Witnesses:
Richard Nunnberger
Moritz Sporer

Inventor:
Carl Robert Friedrich
by F. A. Richards
Attorney.

(No Model.) 3 Sheets—Sheet 3.

C. R. FRIEDRICH.
SLAT BLIND.

No. 591,918. Patented Oct. 19, 1897.

UNITED STATES PATENT OFFICE.

CARL ROBERT FRIEDRICH, OF WERDAU, GERMANY.

SLAT BLIND.

SPECIFICATION forming part of Letters Patent No. 591,918, dated October 19, 1897.

Application filed February 18, 1897. Serial No. 623,995. (No model.)

*To all whom it may concern:*

Be it known that I, CARL ROBERT FRIEDRICH, a subject of the King of Saxony, residing at Werdau, in the Kingdom of Saxony, German Empire, have invented a certain new and useful Improvement in Slat Blinds, of which the following is a full, clear, and exact description.

The present invention consists of a slat blind composed of a series of vertical strips, each having horizontally-arranged slats, and all being adjustable in vertical planes and capable of being rolled up after the manner of an ordinary roller-blind. In addition to this the blind is provided with a device by means of which the lower end of the same may be propped outwardly and thus the device made to serve as a marquee; and in order to render the present specification more easily intelligible reference is had to the accompanying drawings, in which similar letters of reference denote similar parts throughout the several views.

Figure 1:
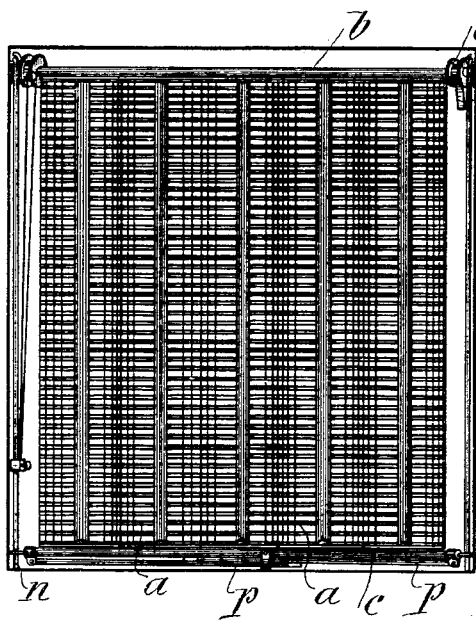
Figure 2:
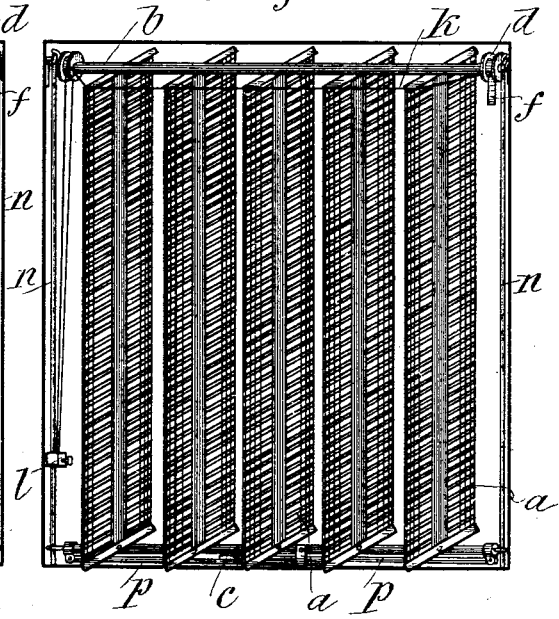
Figure 3:
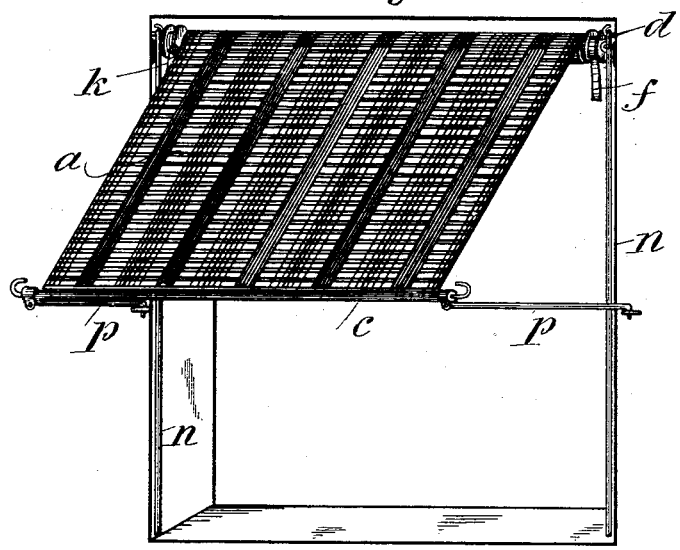
Figure 5:
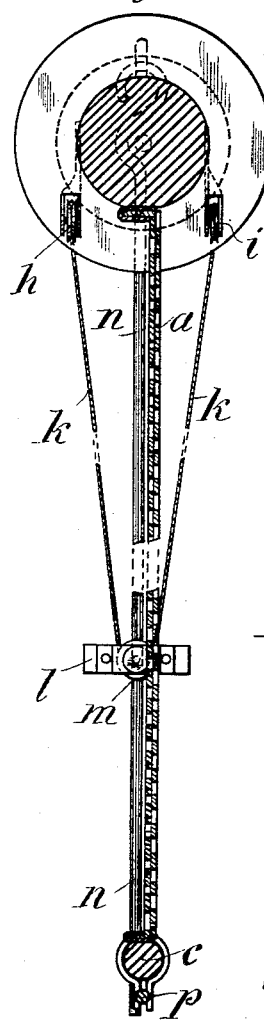
Figure 4:
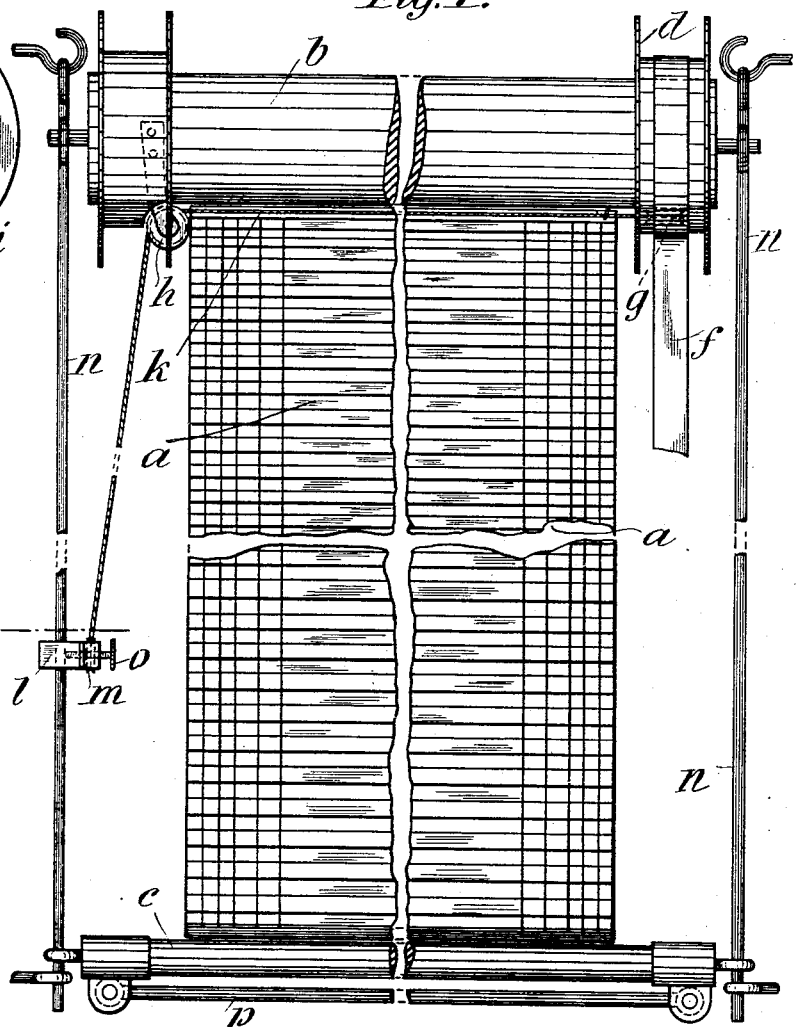
Figure 6:
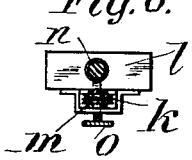
Figure 7:
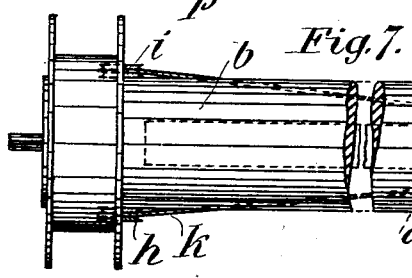
Figure 8:
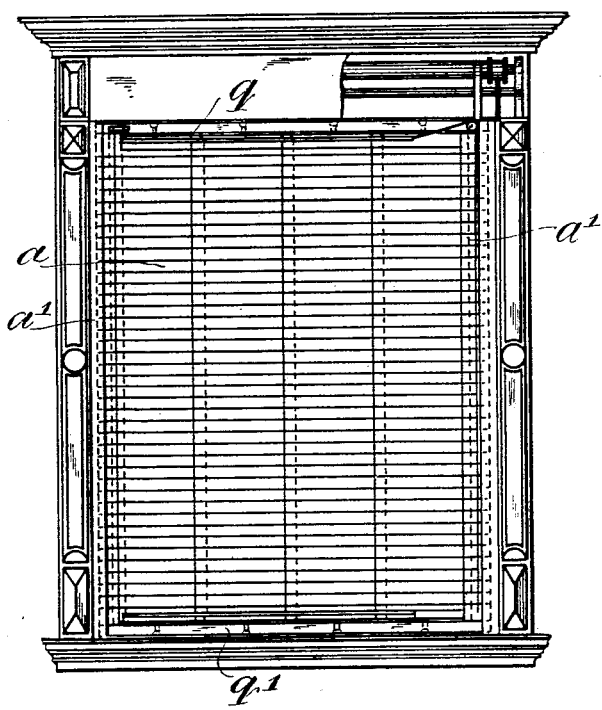
Figure 9:
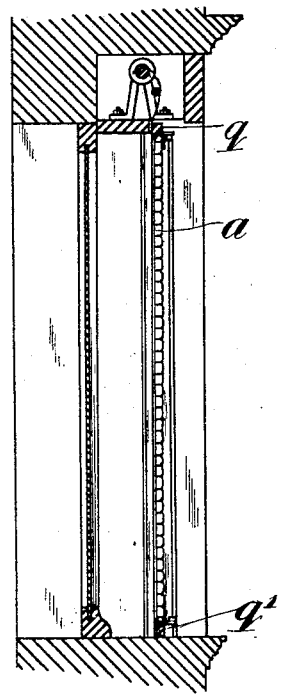

Figure 1 is a front elevation of the blind; Fig. 2, a similar elevation with the vertical strips differently adjusted; Fig. 3, a perspective view with the blind partly rolled up and its lower ends adjusted outwardly like a marquee; Fig. 4, a part front elevation drawn to a larger scale; Fig. 5, an end elevation of Fig. 4; Fig. 6, a plan view of the cord, weight, and roll for adjusting the strips; Fig. 7, a plan of Fig. 4; Fig. 8, a front elevation of a modified form of blind; Fig. 9, a vertical cross-section through Fig. 8; and Fig. 10, a horizontal section through the window, showing the blind in plain view.

Referring to Figs. 1 to 7, the blind is composed of a series of vertical strips $a$, each formed of slats in the ordinary manner and pivoted at the center of its top and bottom bars to a top and bottom bar or roll $b$ and $c$. The top roll $b$ is pivotally mounted in the window-framing in any suitable manner and provided at the right-hand end with a roll $d$, having a cord $f$ by means of which the roller $b$ may be turned and the strips $a$ wound thereon. At the opposite end the roll $b$ is provided with a drum, having mounted thereon two guide-pulleys $h$ and $i$ for a cord. In the cord-roll $d$ a pulley $g$ is also mounted, said three pulleys $h$, $i$, and $g$ being arranged to rotate in a horizontal plane when the blind has been let right down. At each side of the blind are suitably arranged in the window-framing guide-rods $n$ $n$, serving to guide the lower bar $c$ of the blind. On the left-hand rod $n$ a weight $l$, having roll $m$ mounted therein, is arranged to slide loosely up and down said rod and may be fixed in any desired position thereon by means of a screw $o$. A cord $k$ passes around said roll $m$, and leading upward its two lines are guided over the rolls $h$ and $i$, and then round the roll $g$, thus forming an endless cord, the front or rear horizontal line of which is attached to one corner of each of the vertical strips, as will be clearly seen from Fig. 2. By pulling one side of this cord $k$ the strips $a$ may be adjusted into any desired position—thus, for instance, from the position shown at Fig. 1 to that shown at Fig. 2. If then the cord is tightened and the weight $l$ clamped on the rod $n$ by means of the screw $o$, the strips will remain in the position to which they have been adjusted. The strips $a$ being composed of slats may easily be wound on the roll $b$ by means of the cord $f$ after having been adjusted to lie in one plane. As will be seen from Fig. 3, side rods $p$ $p$ are swiveled to the lower bar $c$, which may be turned onto the bar and secured there in any suitable manner, or they may also be turned around at right angles to said bar and be hooked into suitable eyes fixed in the window-frame and thus support the lower end of the blind outwardly after the manner of a marquee.

Figure 10:
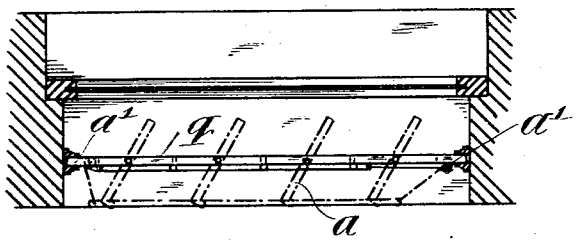

As shown at Figs. 8 to 10, the blind may also be arranged as an ordinary slat-blind, being provided with upper and lower bars $q$ $q'$ and having the side strips $a'$ somewhat narrower and connected to the cross-bars $q$ $q'$ so as to form a frame. This frame with the vertical strips $a$ $a$ can be easily drawn up and let down in any desired manner. The adjustment of the strips takes place in the same manner as heretofore described.

I claim as my invention—

1. The combination of an upper and a lower bar the upper bar having a guide-pulley at one end and a drum at the other end provided with a pair of guide-pulleys; a series of vertical strips each consisting of a plurality of slats, said strips being pivoted at their opposite ends, respectively, to said bars; a movably-mounted roll; an endless cord passed around the said roll and the several guide-pulleys, respectively, and attached to the vertical strips, whereby on the manipulation of the cord the strips can be adjusted; and means for rolling said series of strips up and down on the upper bar.

2. The combination of a series of vertical strips formed of slats, and an upper and a lower bar, a drum on said upper bar having mounted therein two guide-pulleys and a cord-roll at the opposite end having mounted therein one pulley, means for pivoting said strips centrally to said upper and lower bar, a cord, attached to one upper corner of each of said strips, laterally-arranged guide-rods on the window-frame and a weighted roll on one of said rods around which said cord passes substantially as described.

3. The combination of an upper and lower bar, a series of strips composed of slats, and centrally pivoted to said upper and lower bar, guide-rolls on said upper bar as specified and laterally-mounted guide-rods $n\ n$, a weighted guide-roll $m$ to slide on one of said rods $n$, a cord without end to pass over said guide-rolls and having one of its lines fixed to corresponding corners of all the strips, means for rotating the top roller, and arms swiveled to the lower roller and means for detachably securing their free ends to the window-frame substantially as described.

4. The combination, with longitudinal guide-rods, of upper and lower bars the upper bar having a guide-pulley at one end and a drum at the other end provided with guide-pulleys; a series of vertical strips consisting of slats, and pivoted, respectively, at their opposite ends to said bars; a movably-mounted roll, the device for supporting the same being in sliding engagement with one of said guide-rods; an endless cord passed around the several guide-pulleys and roll; and means for rolling the series of strips up and down on the upper bar.

5. The combination, with longitudinal guide-rods, of upper and lower bars the upper bar being furnished with a guide-pulley at one end and a drum at the other end provided with a pair of guide-pulleys; a weight in sliding engagement with one of the guide-rods and carrying a roll; an endless cord passed around the several guide-pulleys and roll and attached to the vertical strips; stay-rods connected with the lower bar; and means whereby said stay-rods can be attached to the guide-rods.

In testimony whereof I have signed my name to this specification in the presence of two subscribing witnesses.

CARL ROBERT FRIEDRICH.

Witnesses:
RICHARD NURNBERGER,
MORITZ SPREER.